US012723168B2

(12) United States Patent
Maeda et al.

(10) Patent No.: US 12,723,168 B2
(45) Date of Patent: Sep. 1, 2026

(54) INKJET INK SET AND LAMINATE FILM

(71) Applicant: SAKATA INX CORPORATION, Osaka (JP)

(72) Inventors: Hirohito Maeda, Osaka (JP); Kazuki Moriyasu, Osaka (JP); Eri Ueda, Osaka (JP); Takaaki Sano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 118 days.

(21) Appl. No.: 18/557,711

(22) PCT Filed: Mar. 14, 2022

(86) PCT No.: PCT/JP2022/011166

§ 371 (c)(1),
(2) Date: Oct. 27, 2023

(87) PCT Pub. No.: WO2023/276302

PCT Pub. Date: Jan. 5, 2023

(65) Prior Publication Data

US 2024/0218199 A1 Jul. 4, 2024

(30) Foreign Application Priority Data

Jun. 29, 2021 (JP) ................................ 2021-107882

(51) Int. Cl.
*C09D 11/40* (2014.01)
*C09D 11/322* (2014.01)
*C09D 11/324* (2014.01)

(52) U.S. Cl.
CPC ............ *C09D 11/40* (2013.01); *C09D 11/322* (2013.01); *C09D 11/324* (2013.01)

(58) Field of Classification Search
CPC ..... C09D 11/40; C09D 11/322; C09D 11/324; C09D 11/102; B32B 27/00; B32B 27/08; B32B 27/20; B32B 27/32; B32B 27/40
See application file for complete search history.

(56) References Cited

U.S. PATENT DOCUMENTS

| | | | | |
|---|---|---|---|---|
| 8,765,839 | B2 | 7/2014 | Hasegawa et al. | |
| 2013/0071637 | A1 | 3/2013 | Matsumyama et al. | |
| 2013/0165584 | A1 | 6/2013 | Ishibashi et al. | |
| 2013/0202862 | A1 | 8/2013 | Hasegawa et al. | |
| 2013/0258007 | A1 | 10/2013 | Hasegawa et al. | |
| 2018/0237650 | A1 | 8/2018 | Oriakhi et al. | |
| 2020/0048488 | A1* | 2/2020 | Wilson | C09D 11/40 |
| 2020/0392360 | A1 | 12/2020 | Sato et al. | |
| 2021/0237415 | A1 | 8/2021 | Sato et al. | |
| 2022/0056294 | A1 | 2/2022 | Sato et al. | |

FOREIGN PATENT DOCUMENTS

| | | | | |
|---|---|---|---|---|
| CN | 102939345 | A | 2/2013 | |
| CN | 111465661 | A | 7/2020 | |
| JP | 2004-149600 | A | 5/2004 | |
| JP | 2012-250416 | A | 12/2012 | |
| JP | 2013-001755 | A | 1/2013 | |
| JP | 2013-001775 | A | 1/2013 | |
| JP | 6031903 | B | 11/2016 | |
| JP | 2017-177353 | A | 1/2017 | |
| JP | 2020029484 | A * | 2/2020 | B32B 27/306 |
| JP | 2020-075979 | A | 5/2020 | |
| JP | 2020-104401 | A | 7/2020 | |
| JP | 2020-176218 | A | 10/2020 | |
| JP | 6821874 | B2 * | 1/2021 | |
| WO | WO 2020/039832 | A1 | 2/2020 | |

OTHER PUBLICATIONS

English machine translation of Yoichi et al. (JP 2020029484 A) (Year: 2020).*
English machine translation of JP_6821874_B2 (Year: 2021).*
International Search Report issued in application No. PCT/JP2022/011166, mailed Jun. 7, 2022.
Extended European Search Report received in European Patent Application No. 22832466.1, dated May 22, 2025.
Office Action issued in corresponding Chinese Patent Application No. 202280029324.0, dated Oct. 10, 2025, in 17 pages.

* cited by examiner

*Primary Examiner* — Ricardo I Magallanes
*Assistant Examiner* — Natasha Dephenia Quinn
(74) *Attorney, Agent, or Firm* — Knobbe Martens Olson & Bear LLP

(57) ABSTRACT

An inkjet ink set in which an aqueous yellow ink composition contains at least one of PY17, PY83, PY128, PY155, and PY180; an aqueous magenta ink composition contains at least one of PR146, PR150, PR176, PR185, and PR254; an aqueous cyan ink composition contains PB15:3; an aqueous black ink composition contains PBk7; an aqueous violet ink composition contains PV23; and each of the aqueous inkjet ink compositions contains an aqueous medium and an alkali-soluble or self-emulsifying polyurethane resin as a binder resin. The inkjet ink set has aqueous inkjet ink compositions having excellent laminate strength and heat resistance.

21 Claims, No Drawings

INKJET INK SET AND LAMINATE FILM

This application is the U.S. National Phase under 35 U.S.C. § 371 of International Application PCT/JP2022/011166, filed Mar. 14, 2022, designating the U.S., and published in Japanese as WO 2023/276302 on Jan. 5, 2023, which claims priority to Japanese Patent Application No. 2021-107882, filed Jun. 29, 2021, the entire content of which is incorporated herein by reference.

TECHNICAL FIELD

The present invention relates to an inkjet ink set and a laminate film.

BACKGROUND ART

In general, food packaging containers made of laminated composite films (laminate films) are used in retort pouch foods, and aqueous inkjet ink compositions for forming a printing ink layer (printing pattern) are known (for example, Patent Documents 1 to 3). However, these aqueous inkjet ink compositions have a problem that adhesion (laminate strength) of plastic to a base film is poor. As an aqueous inkjet ink composition that solves this problem, an aqueous inkjet ink composition for lamination, the composition containing a specific alkali-soluble or self-emulsifying polyurethane resin, is also known (Patent Document 4).

PRIOR ART DOCUMENT

Patent Documents

Patent Document 1: JP-A-2012-250416
Patent Document 2: JP-A-2013-001755
Patent Document 3: JP-A-2013-001775
Patent Document 4: JP-A-2020-029484

SUMMARY OF THE INVENTION

Problems to be Solved by the Invention

On the other hand, the retort pouch food needs to be heat-sterilized (retort treatment) with high-temperature hot water, high-temperature steam, or the like exceeding 100° C. under pressure after filling the food product in the packaging container and heat-sealing the opening of the packaging container. However, the aqueous inkjet ink composition specifically disclosed in Patent Document 4 may be transferred to the base film and the like at the time of retort treatment, and thus was found to be insufficient in heat resistance.

Therefore, an object of the present invention is to provide an inkjet ink set including an aqueous inkjet ink composition having excellent laminate strength and heat resistance.

Means for Solving the Problems

The present invention relates to an inkjet ink set including: aqueous inkjet ink compositions of four colors, the aqueous inkjet ink compositions including an aqueous yellow ink composition, an aqueous magenta ink composition, an aqueous cyan ink composition, and an aqueous black ink composition; or aqueous inkjet ink compositions of five colors, the aqueous inkjet ink compositions including the aqueous yellow ink composition, the aqueous magenta ink composition, the aqueous cyan ink composition, the aqueous black ink composition, and an aqueous violet ink composition, wherein the aqueous yellow ink composition contains at least one type of pigment selected from the group consisting of PY17, PY83, PY128, PY155, and PY180, the aqueous magenta ink composition contains at least one type of pigment selected from the group consisting of PR146, PR150, PR176, PR185, and PR254, the aqueous cyan ink composition contains PB15:3, the aqueous black ink composition contains PBk7, the aqueous violet ink composition contains PV23, and each of the aqueous inkjet ink compositions of four colors and the aqueous inkjet ink compositions of five colors contains an alkali-soluble or self-emulsifying polyurethane resin as a binder resin and an aqueous medium.

The present invention also relates to a laminate film wherein a printed layer formed of each of the aqueous inkjet ink compositions in the inkjet ink set and a sealant film are provided on a base film.

Effect of the Invention

The inkjet ink set of the present invention can exhibit excellent laminate strength and heat resistance by combining aqueous inkjet ink compositions containing a specific pigment, and using an alkali-soluble or self-emulsifying polyurethane resin as a binder resin of each ink composition.

MODE FOR CARRYING OUT THE INVENTION

The inkjet ink set of the present invention includes: aqueous inkjet ink compositions of four colors, the aqueous inkjet ink compositions including an aqueous yellow ink composition, an aqueous magenta ink composition, an aqueous cyan ink composition, and an aqueous black ink composition; or aqueous inkjet ink compositions of five colors, the aqueous inkjet ink compositions including the aqueous yellow ink composition, the aqueous magenta ink composition, the aqueous cyan ink composition, the aqueous black ink composition, and an aqueous violet ink composition. Each of the aqueous inkjet ink compositions of four colors and the aqueous inkjet ink compositions of five colors contains an alkali-soluble or self-emulsifying polyurethane resin as a binder resin and an aqueous medium.

<Pigment>

The aqueous yellow ink composition contains at least one type of pigment selected from the group consisting of PY17, PY128, PY83, PY155, and PY180 as a yellow pigment. Here, "PY" means "C.I. Pigment Yellow".

The aqueous magenta ink composition contains at least one type of pigment selected from the group consisting of PR146, PR150, PR176, PR185, and PR254 as a magenta pigment. Here, "PR" means "C.I. Pigment Red".

The aqueous cyan ink composition contains PB15:3 as a cyan pigment. Here, "PB" means "C.I. Pigment Blue".

The aqueous black ink composition contains PBk7 as a black pigment. Here, "PBk" means "C.I. Pigment Black".

The aqueous violet ink composition contains PV23 as a violet pigment. Here, "PV" means "C.I. Pigment Violet".

The proportion of the pigment in each of the aqueous inkjet ink compositions is preferably 1% by mass or more, more preferably 2% by mass or more from the viewpoint of improving the print density of the printed matter, and is preferably 10% by mass or less, more preferably 8% by mass or less from the viewpoint of improving ejection stability.

From the viewpoint of dispersing the pigment in an aqueous medium, a pigment dispersant may be used as the pigment, and examples of the pigment dispersant include a low-molecular-weight or high-molecular-weight pigment dispersant described in WO 2020/039832 A, and the like.

<Binder Resin>

The binder resin is an alkali-soluble or self-emulsifying polyurethane resin, and has one or two or more anionic groups such as a carboxyl group and a sulfonic acid group. Examples of the alkali-soluble or self-emulsifying polyurethane resin include a reaction product of a diisocyanate compound, a polymer diol compound, and an acid group-containing diol compound, and a reaction product of the diisocyanate compound and the acid group-containing polymer diol compound. As the alkali-soluble or self-emulsifying polyurethane resin, at least one of the above reaction products may be used, and two or more thereof may be used in combination. The alkali-soluble or self-emulsifying polyurethane resin may be used in combination with a pigment dispersant in order to improve adhesion to the film as described above, or may be used for dispersing a pigment (also has a function of improving adhesion to the film). When the alkali-soluble or self-emulsifying polyurethane resin is used as a pigment dispersant for dispersing a pigment in an aqueous medium, the alkali-soluble or self-emulsifying polyurethane resin is preferably an alkali-soluble or self-emulsifying polyurethane resin having a hydrazine residue in the molecule.

The alkali-soluble or self-emulsifying polyurethane resin having a hydrazine residue in the molecule has an acid value of preferably 15 to 50 mg KOH/g, more preferably 15 to 35 mg KOH/g. When the acid value of the alkali-soluble or self-emulsifying polyurethane resin having a hydrazine residue in the molecule is less than 15 mg KOH/g, it is difficult to produce the polyurethane resin. When the acid value is more than 50 mg KOH/g, the water resistance and the like of the printed matter are deteriorated, and the laminate strength tends to be deteriorated. When the acid value of the alkali-soluble or self-emulsifying polyurethane resin having a hydrazine residue in the molecule decreases, the alkali-soluble polyurethane resin changes to the self-emulsifying polyurethane resin. The self-emulsifying polyurethane resin is preferable from the viewpoint that the viscosity of each ink composition of the inkjet ink set of the present invention can be maintained low. Here, the self-emulsifying polyurethane resin refers to a polyurethane resin that has an ionic group in the molecule and has a property of being stably dispersed due to ionization of the ionic group in an aqueous medium. The acid value is a theoretical acid value, and refers to the number of mg of potassium hydroxide theoretically required to neutralize 1 g of polyurethane resin. The acid value is arithmetically obtained based on the molecular weight of a compound containing an anionic group such as a carboxyl group, used as a synthetic component of the polyurethane resin, the blending ratio, the number of anionic groups such as carboxyl groups contained in the molecule of the compound, and the like.

Examples of the diisocyanate compound include aliphatic diisocyanate compounds such as hexamethylene diisocyanate and 2,2,4-trimethylhexamethylene diisocyanate; alicyclic diisocyanate compounds such as isophorone diisocyanate, hydrogenated xylylene diisocyanate, and 4,4-cyclohexylmethane diisocyanate; aromatic aliphatic diisocyanate compounds such as xylylene diisocyanate and tetramethylxylylene diisocyanate; and aromatic diisocyanate compounds such as toluylene diisocyanate and diphenylmethane diisocyanate.

Examples of the polymer diol compound include polyester diol compounds obtained by polycondensation of a low-molecular-weight diol component such as a linear glycol such as 1,3-propanediol, 1,4-butanediol, and 1,6-hexanediol, a branched glycol such as 1,2-propanediol, neopentyl glycol, 3-methyl-1,5-pentanediol, and 2-ethyl-2-butyl-1,3-propanediol, and an ether diol such as diethylene glycol and triethylene glycol with a dibasic acid component such as adipic acid and phthalic acid, or polyester diol compounds obtained by a ring-opening reaction of a cyclic ester compound such as a lactone; polyether diol compounds obtained by homopolymerization or copolymerization of ethylene oxide, propylene oxide, tetrahydrofuran, and the like; polyalkylene glycols such as polyethylene glycol and polypropylene glycol; polyether diol compounds such as alkylene oxide (for example, ethylene oxide, propylene oxide) adducts of bisphenol A; polycarbonate diol compounds obtained by a reaction of a carbonate component such as alkylene carbonate, diallyl carbonate or dialkyl carbonate, or phosgene with the low-molecular-weight diol component; and polybutadiene glycols. Among these, polypropylene glycol and a polyester diol compound are suitable as the alkali-soluble or self-emulsifying polyurethane resin having a hydrazine residue in the molecule, from the viewpoint of boil/retort suitability.

Examples of the acid group-containing diol compound include compounds represented by the general formula (1):

[Formula 1]

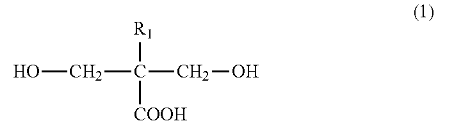

(1)

wherein $R^1$ represents a hydrogen atom or a linear or branched alkyl group having 1 to 8 carbon atoms; aliphatic carboxylic acid-containing polyols obtained by a reaction of succinic acid, adipic acid or the like with a lower polyol; and aromatic carboxylic acid-containing polyols obtained by a reaction of phthalic acid, trimellitic acid, pyromellitic acid or an anhydride thereof with a lower polyol.

Examples of the acid group-containing polymer diol compound include polymer diol compounds obtained by a reaction of the polymer diol compound with a tetrabasic anhydride such as pyromellitic anhydride, or polymer diol compounds obtained by ring-opening polymerization of a lactone using dimethylolpropionic acid or the like as an initiator.

As a method for introducing a hydrazine residue into the alkali-soluble or self-emulsifying polyurethane resin having a hydrazine residue in the molecule, the hydrazine residue can be introduced by a chain extender or a reaction terminator. The reaction terminator used for introducing a hydrazine residue into a polyurethane molecule is, for example, a compound having a functional group for reacting with an isocyanate group and a hydrazine residue. Examples of the reaction terminator that can be used include polyaminohydrazide, hydrazine (hydrazine hydrate), alkylene dihydrazine represented by the following general formula (2): $H_2N—NH—X—NH—NH_2$ (2) (wherein X represents an alkylene group having 1 to 8 carbon atoms or a residue of a saturated or unsaturated dibasic acid having 1 to 10 carbon atoms), and a dihydrazide compound of a saturated aliphatic dibasic acid or an unsaturated dibasic acid. Here, specific examples of the alkylene dihydrazine include methylene dihydrazine, ethylene dihydrazine, and butylene dihydrazine. Specific examples of the dihydrazide compound of a saturated aliphatic dibasic acid include oxalic acid dihydrazide, malonic acid dihydrazide, glutaric acid dihydrazide, adipic acid dihydrazide, and sebacic acid dihydrazide. Specific examples of the dihydrazide compound of an unsaturated dibasic acid include phthalic acid dihydrazide, fumaric acid dihydrazide, and itaconic acid dihydrazide.

For example, an alkylamine such as n-propylamine and N,N-di-n-butylamine such as n-butylamine, and an alkanolamine such as monoethanolamine and diethanolamine can also be used as the reaction terminator, as necessary.

As a method for synthesizing the alkali-soluble or self-emulsifying polyurethane resin (alkali-soluble or self-emulsifying polyurethane resin having a hydrazine residue in the molecule), a known method for synthesizing a polyurethane resin may be used. A method of reacting the above-described components at once, or a method of reacting the components in a divided manner may be used.

The weight average molecular weight of the alkali-soluble or self-emulsifying polyurethane resin having a hydrazine residue in the molecule is preferably 2,000 to 100,000, more preferably 3,000 to 50,000, and still more preferably 5,000 to 30,000. When the weight average molecular weight is less than 2,000, the ink film may be fragile. On the other hand, when the weight average molecular weight is more than 100,000, the viscosity of the aqueous inkjet ink composition tends to be high even with a small content, and the formation of the ink film may be hindered. The weight average molecular weight of the present invention can be measured by gel permeation chromatography (GPC). As an example, the weight average molecular weight in terms of polystyrene can be determined by performing chromatography using Water 2690 (manufactured by Waters Corporation) as a GPC instrument, and PLgel, 5 μm, and MIXED-D (manufactured by Polymer Laboratories Inc.) as a column under the conditions of a tetrahydrofuran as a developing solvent, a column temperature of 25° C., a flow rate of 1 ml/min, an RI detector, a sample injection concentration of 10 mg/ml, and an injection volume of 100 μl.

The alkali-soluble or self-emulsifying polyurethane resin having a hydrazine residue in the molecule is preferably dissolved or emulsified in water in the presence of a basic compound, and used as an aqueous resin varnish.

Examples of the method for dissolving or emulsifying an alkali-soluble or self-emulsifying polyurethane resin having a hydrazine residue in the molecule in an aqueous medium to be described later include a method of dissolving a basic compound in an approximately neutralized amount with respect to the alkali-soluble or self-emulsifying polyurethane resin having a hydrazine residue in the molecule, in an aqueous medium to be described later, then adding the alkali-soluble or self-emulsifying polyurethane resin having a hydrazine residue in the molecule, to the mixture, and stirring the mixture with a high-speed stirrer.

The basic compound is not particularly limited, and commonly used basic compounds can be used. Examples of the basic compound include alkylamines such as butylamine and triethylamine, alkanolamines such as monoethanolamine, diethanolamine, and triethanolamine, morpholine, aqueous ammonia, and sodium hydroxide. The blending amount of the basic compound is appropriately set according to the physical properties, use amount, and the like of the alkali-soluble or self-emulsifying polyurethane resin having a hydrazine residue in the molecule to be used. The basic compound may be used alone or in combination of two or more thereof.

The content of the alkali-soluble or self-emulsifying polyurethane resin having a hydrazine residue in the molecule is appropriately adjusted according to the viscosity behavior of the resin in an aqueous medium to be used, components to be used in combination, desired physical properties of the ink, and the like. The content is preferably 0.3 to 4.0% by mass and more preferably 0.7 to 3.5% by mass in terms of solid content in each of the aqueous inkjet ink compositions from the viewpoint of imparting storage stability, ejection stability, and laminate strength (peel strength between base film and sealant film). When the blending amount is less than 0.3% by mass, the storage stability and laminate strength tend to be deteriorated, and when the blending amount is more than 4.0% by mass, blocking properties tend to be deteriorated.

<Aqueous Medium>

As the aqueous medium, it is preferable to use an aqueous medium containing water and, as necessary, a water-miscible organic solvent or the like.

The water-miscible organic solvent is blended according to desired performance such as drying properties, moisture retainability, and leveling properties at the time of printing in addition to the solubility of the alkali-soluble or self-emulsifying polyurethane resin having a hydrazine residue in the molecule. The water-miscible organic solvent is not particularly limited as long as it does not inhibit the action and effect of the present invention and does not damage the inkjet printer. Monoalcohols, mono- and polyalkylene glycols and alkyl ether compounds thereof, and mono- and polyglycerin and ethylene oxide adducts thereof are suitable for the water-miscible organic solvent.

Specific examples of the monoalcohols include methanol, ethanol, n-propanol, n-butanol, n-pentanol, n-hexanol, n-heptanol, n-octanol, n-nonyl alcohol, n-decanol, isomers thereof, cyclopentanol, and cyclohexanol. An alcohol having an alkyl group having 1 to 6 carbon atoms is preferable.

Specific examples of the mono- and polyalkylene glycols include ethylene glycol, propylene glycol, 1,3-butylene glycol, 1,4-butylene glycol, 1,2-pentanediol, 1,5-pentanediol, neopentyl glycol, 1,2-hexanediol, 1,6-hexanediol, 1,2-cyclohexanediol, heptanediol, 1,8-octanediol, 1,9-nonanediol, 1,10-decanediol, glycerin, pentaerythritol, diethylene glycol, dipropylene glycol, triethylene glycol, tetraethylene glycol, polyethylene glycol, polypropylene glycol, and thiodiglycol.

Specific examples of the alkyl ether compounds of mono- and polyalkylene glycols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, dipropylene glycol mono-n-propyl ether, and dipropylene glycol mono-n-butyl ether.

In the aqueous medium, the mixing ratio of water and the water-miscible organic solvent may also be set according to the characteristics of the ink composition of the intended inkjet ink set, but usually, the aqueous medium preferably contains 2 to 30 wt % of these water-miscible organic solvents.

Each of the aqueous inkjet ink compositions may further contain any component according to the purpose. For example, additives such as a known resin, a resin emulsion, a wax emulsion, a pigment dispersant, a surfactant, a mildewproofing agent, a rust inhibitor, a thickener, an antioxidant, an ultraviolet absorber, a preservability improver, an antifoaming agent, and a pH adjuster can also be added.

<Method for Preparing Aqueous Inkjet Ink Composition>

Each of the aqueous inkjet ink compositions may be prepared by using a conventional preparation method, and the above components may be added in order or simultaneously and mixed. Examples of the preparation method include method (1) in which an aqueous resin varnish, a pigment, and as necessary, a pigment dispersant and the like are mixed, then a pigment dispersion (ink base) is prepared using various dispersers such as a ball mill, an attritor, a roll mill, a sand mill, and an agitator mill, and the remaining materials are further added to prepare an aqueous inkjet ink composition; and method (2) in which a pigment is dispersed by the above-mentioned method, then a resin-coated pigment in which an alkali-soluble resin is deposited on a pigment surface is obtained by, for example, an acid deposition method or an ion exchange method described in Republished patent WO 2005/116147, then the obtained resin-coated pigment is neutralized with a basic compound and redispersed in water using various dispersers (such as a high-speed stirrer), and the remaining materials are further added to prepare an aqueous inkjet ink composition.

The initial viscosity of each of the aqueous inkjet ink compositions is preferably 2.0 to 20.0 mPa·s, and more preferably 3.0 to 10.0 mPa·s.

<Laminate Film>

In the laminate film of the present invention, a printed layer formed of each of the aqueous inkjet ink compositions and a sealant film are provided on a base film. The printed layer and the sealant film are usually laminated with a laminating adhesive interposed therebetween. The printed layer may be provided with a printed layer made of a conventional white ink composition. The white ink composition preferably contains PW6 as a white pigment from the viewpoint of heat resistance. When the aqueous inkjet ink composition is an inkjet ink composition, the white ink composition preferably contains the respective components in the aqueous inkjet ink composition from the viewpoint of laminate strength. The proportion of the white pigment is preferably 4% by mass or more, more preferably 8% by mass or more, and is preferably 30% by mass or less, more preferably 20% by mass or less in the white ink composition. However, printing using the white ink composition is not limited to inkjet printing, and other printing methods such as flexographic printing and gravure printing can be applied.

The base film is formed of a thermoplastic resin having an ability to form a transparent film, or the like. Examples of the main materials used in the field of food packaging containers include polyethylene, polypropylene, an ethylene-vinyl acetate copolymer, polyethylene terephthalate, polybutylene terephthalate, nylon-6, nylon-6,6, polyvinyl chloride, and polyvinylidene chloride.

The base film is preferably subjected to uniaxial or biaxial stretching treatment, and may be subjected to plasma treatment, corona discharge treatment, or the like.

As the laminating adhesive, those conventionally used in lamination processing can be appropriately selected, and examples thereof include urethane resin-based adhesives, imino group-containing resin-based adhesives, and butadiene resin-based adhesives. Among them, a urethane resin-based adhesive is suitable, and a two-component adhesive including a combination of an isocyanate group-terminated urethane prepolymer composed of a polyol component and an excessive aliphatic polyisocyanate component and a polyol component, or a two-component adhesive including a combination of a hydroxyl group-terminated urethane prepolymer composed of an excessive polyol component and an aliphatic polyisocyanate component and a polyisocyanate component can be used. The adhesive may also contain an epoxy compound or a silane coupling agent as necessary.

The application of the laminating adhesive and the lamination of the sealant film can be performed using a known dry lamination processing apparatus including various coating apparatuses such as a roll coater, a bar coater, and a gravure coater.

Examples of the material of the sealant film include non-stretched polyethylene, linear low density polyethylene, non-stretched polypropylene, and an ethylene-vinyl acetate copolymer.

Further, one or more of various functional layers may be provided between the printed layer and the sealant film, for the purpose of improving gas barrier properties, reinforcing strength, and the like. Examples of such a functional layer include a silica-deposited film layer and an alumina-deposited film layer for improving gas barrier properties, and a stretched nylon film layer for improving strength reinforcement. A primer layer may be provided between the base film and the printed layer from the viewpoint of improving printability and adhesion.

The laminate strength (peel strength between the base film and the sealant film) in the laminate film is preferably 50 g/15 mm or more, and more preferably 100 g/15 mm or more.

The laminate strength is a value obtained by measuring the peel strength (dry laminate strength) when the laminate film is cut into a width of 15 mm after 3 days of aging at 40° C. to prepare a test piece, and T-type peeling is performed with a peeling tester (manufactured by Yasuda Seiki Seisakusho, Ltd.).

In order to make the laminate film into a bag, a method can be used in which a laminate film is folded in the middle so that the sealant film side faces the inside of the container, or composite films are stacked, and then the ends thereof are thermally melted and pressure-bonded using a heat sealer or the like. The method can be applied to packaging containers in various heat-sealing forms such as three-sided sealing, four-sided sealing, envelope sealing, butt-seam sealing, and gazette sealing.

EXAMPLES

Hereinafter, the present invention will be specifically described with reference to Examples, but the present invention is not limited to these Examples. Note that "part" and "%" in Examples and Comparative Examples are on a mass basis unless otherwise specified.

<Production of Aqueous Resin Varnish 1>

A four-necked flask equipped with a thermometer, a stirrer, a cooling tube, and a nitrogen introduction tube was charged with 200 parts of polypropylene glycol having a number average molecular weight of 2,000 and 57.4 parts of isophorone diisocyanate. The mixture was reacted at 100 to 105° C. for 4 hours under stirring while nitrogen gas was introduced, then 13.4 parts of dimethylolpropionic acid was charged, and the mixture was reacted at 100 to 110° C. for 2 hours. After confirming that the dimethylolpropionic acid had completely reacted, the mixture was cooled to 100° C. Then, 492.4 parts of water, 8.3 parts of sodium hydroxide having a solid content of 25%, and 3.4 parts of a 25% aqueous ammonia solution were added to the mixture to prepare an aqueous solution. Further, the reaction was stopped with 3.2 parts of aminoethanolamine and 2.5 parts of hydrazine hydrate to obtain an alkali-soluble or self-emulsifying polyurethane resin solution 1 having a hydrazine residue in the molecule and having a solid content of 30%, a weight average molecular weight of 20,000, and a resin acid value of 24.

<Production of Aqueous Resin Varnish 2>

A four-necked flask equipped with a thermometer, a stirrer, a cooling tube, and a nitrogen introduction tube was charged with 300 parts of polyneopentyl adipate diol having a number average molecular weight of 1,000 and 133.2 parts of isophorone diisocyanate. The mixture was reacted at 100 to 105° C. for 4 hours under stirring while nitrogen gas was introduced, then 24.1 parts of dimethylolpropionic acid was charged, and the mixture was reacted at 100 to 110° C. for 2 hours. After confirming that the dimethylolpropionic acid had completely reacted, the mixture was cooled to 100° C. Then, 1,128 parts of water and 20.2 parts of triethylamine were added to the mixture to prepare an aqueous solution. Further, the reaction was stopped with 34.8 parts of dihydrazine adipate to obtain an alkali-soluble or self-emulsifying polyurethane resin solution 2 having a hydrazide residue in the molecule and having a solid content of 30%, a weight average molecular weight of 22,000, and a resin acid value of 24.

<Aqueous Acrylic Resin Varnish>

As the aqueous acrylic resin varnish, VINYBLAN 2687 (acrylic resin emulsion manufactured by Nissin Chemical Industry Co., Ltd., solid content: 30% by mass) was used.

<Preparation of Color Ink Base>

Then, 64.3 parts by mass of water was added to and mixed with 23.7 parts by mass of the aqueous resin varnish to prepare a resin varnish for pigment dispersion. To this varnish, 12 parts by mass of each of the following various pigments was further added, and after stirring and mixing, the mixture was kneaded with a wet circulation mill to prepare various color ink bases.

<Pigment>

[Pigments of Examples]

- PY17 (Graphtol Yellow GG, manufactured by Clariant)
- PY83 (LIONOL YELLOW TT-1842, manufactured by Toyocolor Co., Ltd.)
- PY128 (Cromophtal Yellow L 0990, manufactured by BASF SE)
- PY155 (Cromophtal Yellow 2GF, manufactured by BASF SE)
- PY180 (Cromophtal Yellow K 1410, manufactured by BASF SE)
- PR146 (SYMULER Fast Red 4580, manufactured by DIC Corporation)
- PR150 (Carmine MC-707, manufactured by Arimoto Chemical Co., Ltd.)
- PR176 (SUNBRITE RED 176, manufactured by DIC Corporation)
- PR185 (SYMULAR Fast Red 4594, manufactured by DIC Corporation)
- PR254 (Irgazin Red L 3670 HD, manufactured by BASF SE)
- PB15:3 (HELIOGEN BLUE D 7088, manufactured by BASF SE)
- PV23 (Cromophtal Violet D 5800, manufactured by BASF SE)
- PBk7 (PRINTEX 90, manufactured by Degussa AG)

[Pigments of Comparative Example]

- PY74 (SEIKAFAST YELLOW 2054K, manufactured by Dainichiseika Color & Chemicals Mfg. Co., Ltd.)
- PR170 (SEIKAFAST RED 3820, manufactured by Dainichiseika Color & Chemicals Mfg. Co., Ltd.)
- PV19 (Cromophtal Violet D 5800, manufactured by BASF SE)

<Preparation of White Ink Base>

To 40.0 parts by mass of the aqueous resin varnish, 20.0 parts by mass of water was added and mixed to prepare a resin varnish for pigment dispersion. To this varnish, 40 parts by mass of PW6 (trade name: R-960, manufactured by DuPont) was further added, and after stirring and mixing, the mixture was kneaded with a wet circulation mill to prepare a white ink base.

Example 1

<Production of Aqueous Inkjet Ink Composition>

The color ink base, propylene glycol, OLFINE E1004 (active ingredient: 100%, manufactured by Nissin Chemical Co., Ltd.) and OLFINE E1010 (active ingredient: 100%, manufactured by Nissin Chemical Industry Co., Ltd.) as surfactants, AQUACER 515 (active ingredient: 35%, manufactured by BYK) as a wax emulsion, and water were stirred and mixed so as to have the mass ratio in Table 1, thereby producing an aqueous inkjet ink composition of Example 1.

Examples 2 to 19, Comparative Examples 1 to 4

<Production of Aqueous Inkjet Ink Composition>

The aqueous inkjet ink compositions of Examples and Comparative Examples were produced in the same method as in Example 1 except that the raw materials used and the amounts thereof were changed as shown in Tables 1 and 2 in Examples and Comparative Examples.

<Evaluation of Aqueous Inkjet Ink Composition>

Evaluation was performed by the following method, and the results are shown in Tables 1 and 2.

<Evaluation of Storage Stability>

Each of the aqueous inkjet ink compositions obtained above was placed in a glass bottle, and the viscosity at 25° C. was measured using a viscometer (RE100 L type, manufactured by Toki Sangyo Co., Ltd.). Then, the glass bottle was tightly stopped and stored at 60° C. for 1 month, and the viscosity (25° C.) after storage was measured with a viscometer. The stability over time was evaluated by the rate of viscosity change (60° C., viscosity after 1 month—viscosity before storage/viscosity before storage).

[Evaluation Criteria]

- ○: Rate of viscosity change is less than 5%
- Δ: Rate of viscosity change is 5% or more and less than 10%
- x: Rate of viscosity change is 10% or more and less than 30%

<Evaluation of Ejection Stability>

Each of the aqueous inkjet ink compositions obtained above was packed in a cartridge of an inkjet printer PX105 (manufactured by Seiko Epson Corp.), and printing was performed on photo paper GL-101A450 (manufactured by Canon Inc.), and ejection stability was evaluated.

[Evaluation Criteria]

- ○: There is no printing disorder, and ejection can be stably performed
- Δ: There is some printing disorder, but ejection can be performed
- x: There is printing disorder, and ejection cannot be stably performed <Evaluation of Heat Resistance>

Each of the aqueous inkjet ink compositions obtained above was printed on an ONY film (N1102, manufactured by Toyobo Co., Ltd.) using a 0.15 mm bar coater to form a printed layer, and thus a printed matter was prepared. A urethane-based adhesive (TAKELAC A-616/TAKENATE A-65, manufactured by Mitsui Chemicals & SKC Polyurethanes Inc.) in an amount of 2.0 $g/m^2$ in terms of solid content was applied to the printed layer. Then, a non-stretched polypropylene film (RXC-22, thickness: 60 μm, manufactured by Mitsui Chemicals Tohcello, Inc.) was laminated thereon using a dry laminator, and the laminate was stored at 40° C. for 3 days to obtain a laminate film (1). In addition, a laminate film (2) having no printed layer was obtained by the same method as described above except that the printed layer was not formed. The laminate film (1) and the laminate film (2) were stacked such that the ONY film surfaces thereof faced to each other, and then fixed by being sandwiched between metal plates. The films with metal plates were immersed in pressurized hot water at 120° C. for 30 minutes, and then color transfer to the laminate film (2) was visually evaluated.

[Evaluation Criteria]

○: No color transfer is observed x: Color transfer is clearly observed

<Evaluation of Laminate Strength>

Each of the aqueous inkjet ink compositions obtained above was printed on each of the treated surfaces of a biaxially stretched polyethylene terephthalate (PET) film (E-5102, manufactured by Toyobo Co., Ltd., thickness: 12 μm) having one surface subjected to corona discharge treatment and a biaxially stretched polypropylene (OPP) film (PYLEN P-2161, manufactured by Toyobo Co., Ltd., thickness: 25 μm) having one surface subjected to corona discharge treatment, using a 0.15 mm bar coater. Then, an isocyanate-based adhesive (TAKENATE A-358/TAKELAC A-50, ethyl acetate solution, manufactured by Takeda Pharmaceutical Company Limited.) was applied to the printed layer, and a non-stretched polypropylene film was laminated thereon with a dry laminator to obtain a laminate film. The peel strength (laminate strength) when each of the laminate films is cut into a width of 15 mm after 3 days of aging at 40° C. to prepare a test piece, and T-type peeling is performed with a peeling tester (manufactured by Yasuda Seiki Seisakusho, Ltd.) was measured.

[Evaluation Criteria]

○: Peel strength is 100 g/15 mm or more

Δ: Peel strength is 50 g/15 mm or more and less than 100 g/15 mm x: Peel strength is less than 50 g/15 mm <Evaluation of Laminate Strength at the Time of Overprinting with Aqueous White Inkjet Ink Composition>

Each of the aqueous inkjet ink compositions other than the white inkjet ink composition obtained above was printed on each of the treated surfaces of a biaxially stretched polyethylene terephthalate (PET) film (E-5102, manufactured by Toyobo Co., Ltd., thickness: 12 μm) having one surface subjected to corona discharge treatment and a biaxially stretched polypropylene (OPP) film (PYLEN P-2161, manufactured by Toyobo Co., Ltd., thickness: 25 μm) having one surface subjected to corona discharge treatment, using a 0.15 mm bar coater. Then, the aqueous white inkjet ink composition was printed using a 0.15 mm bar coater. Thereafter, an isocyanate-based adhesive (TAKENATE A-358/TAKELAC A-50, ethyl acetate solution, manufactured by Takeda Pharmaceutical Company Limited.) was applied to the printed layer, and a non-stretched polypropylene film was laminated thereon with a dry laminator to obtain a laminate film. The peel strength (laminate strength) when each of the laminate films is cut into a width of 15 mm after 3 days of aging at 40° C. to prepare a test piece, and T-type peeling is performed with a peeling tester (manufactured by Yasuda Seiki Seisakusho, Ltd.) was measured.

[Evaluation Criteria]

○: Peel strength is 100 g/15 mm or more

Δ: Peel strength is 50 g/15 mm or more and less than 100 g/15 mm x: Peel strength is less than 50 g/15 mm <Evaluation of Laminate Strength at the Time of Overprinting with Aqueous White Flexo Ink Composition>

A case where an aqueous white flexo ink composition for lamination is used instead of the aqueous white inkjet ink composition will be described.

<Production of Aqueous Urethane Resin Emulsion>

A four-necked flask equipped with a thermometer, a stirrer, a cooling tube, and a nitrogen introduction tube was charged with 300 parts of polyneopentyl adipate diol having a number average molecular weight of 1,000 and 133.2 parts of isophorone diisocyanate. The mixture was reacted at 100 to 105° C. for 4 hours under stirring while nitrogen gas was introduced, then 24.1 parts of dimethylolpropionic acid was charged, and the mixture was reacted at 100 to 110° C. for 2 hours. After confirming that the dimethylolpropionic acid had completely reacted, the mixture was cooled to 100° C., and 1,128 parts of water and 20.2 parts of triethylamine were added to prepare an aqueous solution. Further, the reaction was stopped with 34.8 parts of dihydrazine adipate to obtain an aqueous polyurethane resin solution having a solid content of 30% and a resin acid value of 24.

<Production of Aqueous White Flexo Ink Composition for Lamination>

PW6 (40 parts, trade name: R-960, manufactured by DuPont), 2 parts of a water-soluble acrylic resin (styrene/lauryl methacrylate/acrylic acid copolymer (acid value: 100 mg KOH/g, weight average molecular weight: 11,000, neutralized with ammonia, solid content; 28% by mass)), 10 parts of an aqueous polyurethane resin solution (solid content) were kneaded using a paint conditioner manufactured by Red Devil, Inc. Further, 0.5 parts of an acetylene-based surfactant (acetylene-based surfactant: 2,4,7,9-tetramethyl-5-decyne-4,7-diol, HLB value: 4), 5.0 parts of propylene glycol as a water-soluble organic solvent, 2 parts of a curing agent (SU-125F (aziridine-based curing agent, solid content: 25%, manufactured by Meisei Chemical Works, Ltd.)), and 42.5 parts of water were added to the mixture, followed by stirring, and thus an aqueous white flexo ink composition for lamination was obtained.

<Preparation of Printed Matter>

Each of the aqueous inkjet ink compositions other than the white inkjet ink composition obtained above was printed on an ONY film (N1102, manufactured by Toyobo Co., Ltd.) using a 0.15 mm bar coater to form a printed layer on the treated surface of the film, and thus a printed matter was prepared. Then, the aqueous white flexo ink composition for lamination was overprinted on the prepared printed matter using a flexographic printer under the following conditions, and dried to obtain a printed matter. Thereafter, an isocyanate-based adhesive (TAKENATE A-358/TAKELAC A-50, ethyl acetate solution, manufactured by Takeda Pharmaceutical Company Limited.) was applied to the printed layer, and a non-stretched polypropylene film was laminated thereon with a dry laminator to obtain a laminate film. The peel strength (laminate strength) when each of the laminate films is cut into a width of 15 mm after 3 days of aging at 40° C. to prepare a test piece, and T-type peeling is performed with a peeling tester (manufactured by Yasuda Seiki Seisakusho, Ltd.) was measured.

(Printing Method/Printing Conditions)

Environment inside room at the time of printing: temperature 25° C., humidity 50%

Application machine: Flexographic printer

Application speed: 150 m/min

Plate: Printing plate on which white color is printed: solid plate

Drying temperature: 55° C.

[Evaluation Criteria]

○: Peel strength is 100 g/15 mm or more

Δ: Peel strength is 50 g/15 mm or more and less than 100 g/15 mm x: Peel strength is less than 50 g/15 mm

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Aqueous inkjet ink composition | Ink base *ink base using aqueous polyurethane resin varnish 1 is referred to as BASE, and ink base using aqueous polyurethane resin varnish 2 is referred to as BASE2) | BASE-PY17 | 34 | — | — | — | — | — | — | — | — | — |
| | | BASE-PY83 | — | 34 | — | — | — | — | — | — | — | — |
| | | BASE2-PY83 | — | — | 34 | — | — | — | — | — | — | — |
| | | BASE-PY155 | — | — | — | 34 | — | — | — | — | — | — |
| | | BASE-PY180 | — | — | — | — | 34 | — | — | — | — | — |
| | | BASE-PR146 | — | — | — | — | — | 34 | — | — | — | — |
| | | BASE-PR150 | — | — | — | — | — | — | 34 | — | — | — |
| | | BASE-PR176 | — | — | — | — | — | — | — | 34 | — | — |
| | | BASE-PR185 | — | — | — | — | — | — | — | — | 34 | — |
| | | BASE-PR254 | — | — | — | — | — | — | — | — | — | 34 |
| | | BASE-PB15:3 | — | — | — | — | — | — | — | — | — | — |
| | | BASE-PV23 | — | — | — | — | — | — | — | — | — | — |
| | | BASE-PBk7 | — | — | — | — | — | — | — | — | — | — |
| | | BASE-PW6 | — | — | — | — | — | — | — | — | — | — |
| | Solvent | Propylene glycol | 35 | 35 | 35 | 35 | 35 | 35 | 35 | 35 | 35 | 35 |
| | Surfactant | OLFINE E1004 | 0.5 | 0.5 | 0.5 | 0.5 | 0.5 | 0.5 | 0.5 | 0.5 | 0.5 | 0.5 |
| | | OLFINE E1010 | 0.5 | 0.5 | 0.5 | 0.5 | 0.5 | 0.5 | 0.5 | 0.5 | 0.5 | 0.5 |
| | Wax emulsion | AQUACER 515 | 1.8 | 1.8 | 1.8 | 1.8 | 1.8 | 1.8 | 1.8 | 1.8 | 1.8 | 1.8 |
| | Water | | 28.2 | 28.2 | 28.2 | 28.2 | 28.2 | 28.2 | 28.2 | 28.2 | 28.2 | 28.2 |
| | Total | | 100 | 100 | 100 | 100 | 100 | 100 | 100 | 100 | 100 | 100 |
| Evaluation results | Storage stability | | ○ | ○ | ○ | ○ | Δ | ○ | ○ | ○ | ○ | ○ |
| | Ejection stability | | ○ | ○ | ○ | ○ | ○ | ○ | ○ | ○ | ○ | ○ |
| | Heat resistance | | ○ | ○ | ○ | ○ | ○ | ○ | ○ | ○ | ○ | ○ |
| | Laminate strength (monochromatic color) | | ○ | ○ | ○ | ○ | ○ | ○ | ○ | ○ | ○ | ○ |
| | Laminate strength (overprinting, aqueous white inkjet ink composition) | | ○ | ○ | ○ | ○ | ○ | ○ | ○ | ○ | ○ | ○ |
| | Laminate strength (overprinting, aqueous white flexo ink composition for lamination) | | ○ | ○ | ○ | ○ | ○ | ○ | ○ | ○ | ○ | ○ |

TABLE 1-continued

| | | | Example | | | | | | | | |
|---|---|---|---|---|---|---|---|---|---|---|---|
| | | | 11 | 12 | 13 | 14 | 15 | 16 | 17 | 18 | 19 |
| Aqueous inkjet ink composition | Ink base *ink base using aqueous polyurethane resin varnish 1 is referred to as BASE, and ink base using aqueous polyurethane resin varnish 2 is referred to as BASE2) | BASE-PY17 | — | — | — | — | — | — | — | — | — |
| | | BASE-PY83 | — | — | — | — | — | — | — | — | — |
| | | BASE2-PY83 | — | — | — | — | — | — | — | — | — |
| | | BASE-PY155 | — | — | — | — | — | — | — | — | — |
| | | BASE-PY180 | — | — | — | — | — | — | — | — | — |
| | | BASE-PR146 | — | — | — | — | — | — | — | — | — |
| | | BASE-PR150 | — | — | — | — | — | — | — | — | — |
| | | BASE-PR176 | — | — | — | — | — | — | — | — | — |
| | | BASE-PR185 | — | — | — | — | — | — | — | — | — |
| | | BASE-PR254 | — | — | — | — | — | — | — | — | — |
| | | BASE-PB15:3 | 34 | — | — | — | — | — | — | — | — |
| | | BASE-PV23 | — | 34 | — | — | — | — | — | — | — |
| | | BASE-PBk7 | — | — | 34 | — | 34 | 34 | 34 | 34 | 34 |
| | | BASE-PW6 | — | — | — | 25 | — | — | — | — | — |
| | Solvent | Propylene glycol | 35 | 35 | 35 | 35 | 35 | 35 | 35 | 35 | 35 |
| | Surfactant | OLFINE E1004 | 0.5 | 0.5 | 0.5 | 0.5 | — | 1 | 0.5 | 0.5 | 0.5 |
| | | OLFINE E1010 | 0.5 | 0.5 | 0.5 | 0.5 | 0.5 | 0.5 | — | 1 | 0.5 |
| | Wax emulsion | AQUACER 515 | 1.8 | 1.8 | 1.8 | 1.8 | 1.8 | 1.8 | 1.8 | 1.8 | — |
| | Water | | 28.2 | 28.2 | 28.2 | 37.2 | 28.7 | 27.7 | 28.7 | 27.7 | 30 |
| | Total | | 100 | 100 | 100 | 100 | 100 | 100 | 100 | 100 | 100 |
| Evaluation results | Storage stability | | ○ | ○ | ○ | ○ | ○ | ○ | ○ | ○ | ○ |
| | Ejection stability | | ○ | ○ | ○ | ○ | ○ | ○ | ○ | ○ | ○ |
| | Heat resistance | | ○ | ○ | ○ | ○ | ○ | ○ | ○ | ○ | ○ |
| | Laminate strength (monochromatic color) | | ○ | ○ | ○ | ○ | ○ | ○ | ○ | ○ | ○ |
| | Laminate strength (overprinting, aqueous white inkjet ink composition) | | ○ | ○ | ○ | — | ○ | ○ | ○ | ○ | ○ |
| | Laminate strength (overprinting, aqueous white flexo ink composition for lamination) | | ○ | ○ | ○ | — | ○ | ○ | ○ | ○ | ○ |

TABLE 2

| | | | Comparative Example | | | |
|---|---|---|---|---|---|---|
| | | | 1 | 2 | 3 | 4 |
| Ink base *ink base using aqueous polyurethane resin varnish 1 is referred to as BASE, and ink base using aqueous polyurethane resin varnish 2 is referred to as BASE2) | Urethane resin ink base | BASE-PY74 | 34 | — | — | — |
| | | BASE-PR170 | — | 34 | — | — |
| | | BASE-PV19 | — | — | 34 | — |
| | Acrylic resin ink base | BASE-PR146-ACRYL | — | — | — | 34 |
| | Solvent | Propylene glycol | 35 | 35 | 35 | 35 |
| | Surfactant | OLFINE E1004 | 0.5 | 0.5 | 0.5 | 0.5 |
| | | OLFINE E1010 | 0.5 | 0.5 | 0.5 | 0.5 |
| | Wax emulsion | AQUACER 515 | 1.8 | 1.8 | 1.8 | 1.8 |
| | Water | | 28.2 | 28.2 | 28.2 | 28.2 |
| | Total | | 100 | 100 | 100 | 100 |
| Evaluation results | Storage stability | | ○ | ○ | ○ | ○ |
| | Ejection stability | | ○ | ○ | ○ | ○ |
| | Heat resistance | | x | x | x | ○ |
| | Laminate strength | | ○ | ○ | ○ | x |
| | Laminate strength (overprinting, aqueous white inkjet ink composition) | | ○ | ○ | ○ | x |
| | Laminate strength (overprinting, aqueous white flexo ink composition for lamination) | | ○ | ○ | ○ | x |

What is claimed is:

1. An inkjet ink set comprising:

aqueous inkjet ink compositions of five colors, the aqueous inkjet ink compositions including an aqueous yellow ink composition, an aqueous magenta ink composition, an aqueous cyan ink composition, an aqueous black ink composition, and an aqueous violet ink composition, wherein:

the aqueous yellow ink composition contains at least one type of pigment selected from the group consisting of PY17, PY83, PY128, PY155, and PY180;

the aqueous magenta ink composition contains at least one type of pigment selected from the group consisting of PR146, PR150, PR176, PR185, and PR254;

the aqueous cyan ink composition contains PB15:3;

the aqueous black ink composition contains PBk7;

the aqueous violet ink composition contains PV23;

each of the aqueous inkjet ink compositions of five colors contains an alkali-soluble or self-emulsifying polyurethane resin as a binder resin and an aqueous medium;

the alkali-soluble or self-emulsifying polyurethane resin is a reaction product of a diisocyanate, a polymer diol compound, and an acid group-containing diol compound; and the diisocyanate is one or more selected from the group consisting of alicyclic diisocyanate compounds, aromatic aliphatic diisocyanate compounds, and aromatic diisocyanate compounds.

2. The inkjet ink set according to claim 1, wherein the alkali-soluble or self-emulsifying polyurethane resin is an alkali-soluble or self-emulsifying polyurethane resin comprising a hydrazine residue.

3. The inkjet ink set according to claim 1, wherein the polymer diol compound is polypropylene glycol and/or a polyester diol compound.

4. The inkjet ink set according to claim 2, wherein a proportion of the alkali-soluble or self-emulsifying polyurethane resin having a hydrazine residue is 0.3 to 4.0% by mass in each of the aqueous inkjet ink compositions.

5. The inkjet ink set according to claim 2, wherein the alkali-soluble or self-emulsifying polyurethane resin having a hydrazine residue has an acid value of 15 to 35 mg KOH/g.

6. The inkjet ink set according to claim 1, wherein each of the aqueous inkjet ink compositions is an aqueous inkjet ink composition for lamination.

7. A laminate film wherein a printed layer formed of each of the aqueous inkjet ink compositions in the inkjet ink set according to claim 1 and a sealant film are provided on a base film.

8. An inkjet ink set comprising:

aqueous inkjet ink compositions of four colors, the aqueous inkjet ink compositions including an aqueous yellow ink composition, an aqueous magenta ink composition, an aqueous cyan ink composition, and an aqueous black ink composition, wherein:

the aqueous yellow ink composition contains at least one type of pigment selected from the group consisting of PY17, PY83, PY128, and PY180;

the aqueous magenta ink composition contains at least one type of pigment selected from the group consisting of PR146, PR150, PR176, PR185, and PR254;

the aqueous cyan ink composition contains PB15:3;

the aqueous black ink composition contains PBk7;

each of the aqueous inkjet ink compositions of four colors contains an alkali-soluble or self-emulsifying polyurethane resin as a binder resin and an aqueous medium;

the alkali-soluble or self-emulsifying polyurethane resin is a reaction product of a diisocyanate, a polymer diol compound, and an acid group-containing diol compound; and the diisocyanate is one or more selected from the group consisting of alicyclic diisocyanate compounds, aromatic aliphatic diisocyanate compounds, and aromatic diisocyanate compounds.

9. The inkjet ink set according to claim 8, wherein the alkali-soluble or self-emulsifying polyurethane resin is an alkali-soluble or self-emulsifying polyurethane resin having a hydrazine residue in a molecule.

10. The inkjet ink set according to claim 8, wherein the polymer diol compound is polypropylene glycol and/or a polyester diol compound.

11. The inkjet ink set according to claim 9, wherein a proportion of the alkali-soluble or self-emulsifying polyurethane resin having a hydrazine residue in a molecule is 0.3 to 4.0% by mass in each of the aqueous inkjet ink compositions.

12. The inkjet ink set according to claim 9, wherein the alkali-soluble or self-emulsifying polyurethane resin having a hydrazine residue in a molecule has an acid value of 15 to 35 mg KOH/g.

13. The inkjet ink set according to claim 8, wherein each of the aqueous inkjet ink compositions is an aqueous inkjet ink composition for lamination.

14. A laminate film wherein a printed layer formed of each of the aqueous inkjet ink compositions in the inkjet ink set according to claim 8 and a sealant film are provided on a base film.

15. An inkjet ink set comprising:

aqueous inkjet ink compositions of four colors, the aqueous inkjet ink compositions including an aqueous yellow ink composition, an aqueous magenta ink composition, an aqueous cyan ink composition, and an aqueous black ink composition, wherein:

the aqueous yellow ink composition contains at least one type of pigment selected from the group consisting of PY17, PY83, PY128, PY155, and PY180;

the aqueous magenta ink composition contains at least one type of pigment selected from the group consisting of PR146, PR150, PR176, and PR185;

the aqueous cyan ink composition contains PB15:3;

the aqueous black ink composition contains PBk7, each of the aqueous inkjet ink compositions of four colors contains an alkali-soluble or self-emulsifying polyurethane resin as a binder resin and an aqueous medium;

the alkali-soluble or self-emulsifying polyurethane resin is a reaction product of a diisocyanate, a polymer diol compound, and an acid group-containing diol compound; and the diisocyanate is one or more selected from the group consisting of alicyclic diisocyanate compounds, aromatic aliphatic diisocyanate compounds, and aromatic diisocyanate compounds.

16. The inkjet ink set according to claim 15, wherein the polymer diol compound is polypropylene glycol and/or a polyester diol compound.

17. The inkjet ink set according to claim 15, wherein the alkali-soluble or self-emulsifying polyurethane resin is an alkali-soluble or self-emulsifying polyurethane resin having a hydrazine residue in a molecule.

18. The inkjet ink set according to claim 17, wherein a proportion of the alkali-soluble or self-emulsifying polyurethane resin having a hydrazine residue in a molecule is 0.3 to 4.0% by mass in each of the aqueous inkjet ink compositions.

19. The inkjet ink set according to claim 17, wherein the alkali-soluble or self-emulsifying polyurethane resin having a hydrazine residue in a molecule has an acid value of 15 to 35 mg KOH/g.

20. The inkjet ink set according to claim 15, wherein each of the aqueous inkjet ink compositions is an aqueous inkjet ink composition for lamination.

21. A laminate film wherein a printed layer formed of each of the aqueous inkjet ink compositions in the inkjet ink set according to claim 15 and a sealant film are provided on a base film.

* * * * *